United States Patent
Osada et al.

(10) Patent No.: US 11,011,775 B2
(45) Date of Patent: *May 18, 2021

(54) SULFIDE SOLID ELECTROLYTE MATERIAL, SULFIDE GLASS, SOLID STATE LITHIUM BATTERY, AND METHOD FOR PRODUCING SULFIDE SOLID ELECTROLYTE MATERIAL

(71) Applicant: TOYOTA JIDOSHA KABUSHIKI KAISHA, Toyota (JP)

(72) Inventors: Naoki Osada, Susono (JP); Shigenori Hama, Shunntou-gun (JP); Tomoya Suzuki, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 59 days.

This patent is subject to a terminal disclaimer.

(21) Appl. No.: 14/897,332

(22) PCT Filed: May 26, 2014

(86) PCT No.: PCT/JP2014/063831
§ 371 (c)(1),
(2) Date: Dec. 10, 2015

(87) PCT Pub. No.: WO2014/208239
PCT Pub. Date: Dec. 31, 2014

(65) Prior Publication Data
US 2016/0149259 A1    May 26, 2016

(30) Foreign Application Priority Data

Jun. 28, 2013 (JP) .............................. JP2013-137329

(51) Int. Cl.
*H01M 10/0562* (2010.01)
*H01M 10/0525* (2010.01)
(Continued)

(52) U.S. Cl.
CPC ......... *H01M 10/0562* (2013.01); *C03C 3/323* (2013.01); *C03C 4/18* (2013.01);
(Continued)

(58) Field of Classification Search
CPC ....... H01M 10/0562; C03C 4/18; C03C 3/323
See application file for complete search history.

(56) References Cited

U.S. PATENT DOCUMENTS

| 4,585,714 A | 4/1986 | Akridge |
| 6,066,417 A | 5/2000 | Cho et al. |

(Continued)

FOREIGN PATENT DOCUMENTS

| CN | 1918668 A | 12/2010 |
| CN | 103125044 A | 5/2013 |

(Continued)

OTHER PUBLICATIONS

Ujiie, Satoshi et al, "Preparation and ionic conductivity of (100-x)(0.8Li2S•0.2P2S5)•xLiI glass-ceramic electrolytes," Journal of Solid State Electrochemistry, vol. 17, 2013 (published online Oct. 19, 2012), pp. 675-680.

(Continued)

*Primary Examiner* — Miriam Stagg
*Assistant Examiner* — Brent C Thomas
(74) *Attorney, Agent, or Firm* — Oliff PLC

(57) ABSTRACT

A sulfide solid electrolyte material having a high Li ion conductivity is provided. A sulfide solid electrolyte material includes Li, P, I and S, having peaks at $2\theta=20.2°$ and $23.6°$, not having peaks at $2\theta=21.0°$ and $28.0°$ in an X-ray diffraction measurement using a CuKα ray, and having a half width of the peak at $2\theta=20.2°$ of $0.51°$ or less.

17 Claims, 7 Drawing Sheets

(51) Int. Cl.
*H01M 10/052* (2010.01)
*C03C 4/18* (2006.01)
*C03C 10/00* (2006.01)
*C03C 3/32* (2006.01)

(52) U.S. Cl.
CPC ........... *C03C 10/00* (2013.01); *H01M 10/052* (2013.01); *H01M 10/0525* (2013.01); *H01M 2220/30* (2013.01); *Y02T 10/70* (2013.01)

(56) References Cited

U.S. PATENT DOCUMENTS

| | | | |
|---|---|---|---|
| 2007/0160911 | A1 | 7/2007 | Senga et al. |
| 2010/0273062 | A1* | 10/2010 | Tsuchida ............... H01M 4/131 429/304 |
| 2011/0065007 | A1* | 3/2011 | Kamiya ............ H01M 10/0562 429/322 |
| 2013/0164631 | A1 | 6/2013 | Ohtomo et al. |
| 2013/0177821 | A1 | 7/2013 | Tsuchida et al. |
| 2014/0141341 | A1 | 5/2014 | Ohtomo et al. |
| 2015/0207170 | A1* | 7/2015 | Aburatani ................ H01B 1/10 429/306 |

FOREIGN PATENT DOCUMENTS

| | | | |
|---|---|---|---|
| JP | S62-008467 | A | 1/1987 |
| JP | H0536117 | A | 2/1993 |
| JP | H05-306117 | A | 11/1993 |
| JP | H05-306119 | A | 11/1993 |
| JP | 11-73993 | A | 3/1999 |
| JP | 2012-048971 | A | 3/2012 |
| JP | 2013-016423 | A | 1/2013 |
| JP | 2014-029796 | A | 2/2014 |
| WO | WO-2012026238 | A1 * | 3/2012 ........ H01M 10/0525 |
| WO | 2013/005085 | A1 | 1/2013 |

OTHER PUBLICATIONS

Mar. 22, 2017 Office Action issued in U.S. Appl. No. 14/896,557.
Jan. 11, 2018 Office Action issued in U.S. Appl. No. 14/896,557.
Sep. 28, 2017 Office Action issued in U.S. Appl. No. 14/896,557.
Jul. 5, 2018 Notice of Allowance issued in U.S. Appl. No. 14/896,557.
Jul. 25, 2018 Corrected Notice of Allowability issued in U.S. Appl. No. 14/896,557.
Nov. 8, 2019 Office Action issued in U.S. Appl. No. 15/951,734.
Mar. 27, 2020 Notice of Allowance issued in U.S. Appl. No. 15/951,734.

* cited by examiner

SULFIDE SOLID ELECTROLYTE MATERIAL

SULFIDE SOLID ELECTROLYTE MATERIAL, SULFIDE GLASS, SOLID STATE LITHIUM BATTERY, AND METHOD FOR PRODUCING SULFIDE SOLID ELECTROLYTE MATERIAL

TECHNICAL FIELD

The present invention relates to a sulfide solid electrolyte material having a high Li ion conductivity.

BACKGROUND ART

In accordance with a rapid spread of information related devices and communication devices such as a personal computer, a video camera and a cellular phone in recent years, the development of a battery to be utilized as a power source thereof has been emphasized. The development of a high-output and high-capacity battery for an electric automobile or a hybrid automobile has been under progress also in an automobile industry. Among various kinds of batteries, a lithium battery has been presently noticed from the viewpoint of having a high energy density.

Liquid electrolyte containing a flammable organic solvent is used for a presently commercialized lithium battery, so that the installation of a safety device for restraining temperature increase during a short circuit or the improvement in structure and material for preventing the short circuit is necessary therefor. To the contrary, a lithium battery all-solidified by replacing the liquid electrolyte with a solid electrolyte layer has a simplified safety device and it is considered to be excellent in terms of production cost and productivity for the reason that the flammable organic solvent is not used in the battery. Furthermore, as a solid electrolyte material used for a solid electrolyte layer, a sulfide solid electrolyte material is known.

As the sulfide solid electrolyte material has a high Li ion conductivity, it is useful for obtaining high output of a battery. Thus, various studies have been conventionally made. For example, in Patent Literature 1, it is disclosed that glass ceramics can be obtained by heat treatment of LiI—$Li_2S$—$P_2S_5$-based sulfide glass. Further, in Patent Literature 2, it is disclosed that the Li ion conductivity can be improved by adding LiI, LiCl, LiBr, or the like to $Li_2S$—$P_2S_5$-based sulfide solid electrolyte. Further, in Patent Literature 3, $Li_2S$—$P_2S_5$—LiX—$Li_2CO_3$-based solid electrolyte is disclosed. Incidentally, X represents I, Cl, or Br. Still further, in Patent Literature 4, adding a plurality of LiI, LiCl, LiBr, or the like to $Li_3PO_4$—$Li_2S$—$P_2S_5$-based solid electrolyte is disclosed.

CITATION LIST

Patent Literatures

Patent Literature 1: Japanese Patent Application Publication (JP-A) No. 2013-016423
Patent Literature 2: JP-A No. 2012-048971
Patent Literature 3: JP-A No. S62-008467
Patent Literature 4: JP-A No. H05-306117

SUMMARY OF INVENTION

Technical Problem

In Patent Literature 1, a high Li ion conducting phase having peaks at 2θ=20.2° and 23.6° and a low Li ion conducting phase having peaks at 2θ=21.0° and 28.0° are disclosed. From the viewpoint of ion conductivity, it is preferable that the high Li ion conducting phase has high crystallinity. However, when the heat treatment temperature is increased or heat treatment time is extended in order to have higher crystallinity, a low Li ion conducting phase is generated so that it is difficult to increase the Li ion conductivity. Furthermore, when the heat treatment is carried out at the condition at which a low Li ion conducting phase is not generated, the crystallinity of a high Li ion conducting phase cannot be increased. For such reasons, it is also difficult for the case to have increased Li ion conductivity.

The present invention is achieved in view of the above circumstances, and a main object is to provide a sulfide solid electrolyte material having a high Li ion conductivity.

Solution to Problem

To solve the aforementioned problems, inventors of the present invention conducted intensive studies, and as a result, it was found in the present invention that a tiny exothermic peak present at higher temperature side than the exothermic peak of a high Li ion conducting phase in differential thermal analysis corresponds to an exothermic peak of a low Li ion conducting phase. It was also found that, by shifting the tiny exothermic peak to a high temperature side, crystallinity of a high Li ion conducting phase can be increased without generating a low Li ion conducting phase. Accordingly, it was found that the crystallinity of a high Li ion conducting phase can be increased compared to a related art. The present invention is completed based on this finding.

That is, in the present invention, there is provided a sulfide solid electrolyte material comprising Li, P, I and S, having peaks at 2θ=20.2° and 23.6°, not having peaks at 2θ=21.0° and 28.0° in an X-ray diffraction measurement using a CuKα ray, and having a half width of the peak at 2θ=20.2° of 0.51° or less.

According to the present invention, a sulfide solid electrolyte material which contains a high Li ion conducting phase having peaks at 2θ=20.2° and 23.6° and has a high Li ion conductivity due to the high crystallinity can be provided. Furthermore, by not containing any low Li conducting phase having peaks at 2θ=21.0° and 28.0°, a sulfide solid electrolyte material having a high Li ion conductivity can be provided according to the present invention.

According to the aforementioned invention, it is preferable that the sulfide solid electrolyte material comprises an ion conductor having Li, P, and S and at least one of LiI, LiBr, and LiCl.

According to the aforementioned invention, it is preferable that the sulfide solid electrolyte material contains the above-mentioned LiBr and LiBr/(LiI+LiBr) is in the range of 25 mol % to 50 mol %.

According to the aforementioned invention, it is preferable that the sulfide solid electrolyte material uses a raw material composition which contains at least $Li_2S$, $P_2S_5$, and LiI, characterized in that $Li_2S/(Li_2S+P_2S_5)$ is in the range of 76 mol % to 78 mol %.

In addition, in the present invention, there is provided a sulfide glass comprising Li, P, I, Br, and S, and satisfying $T_{cx}-T_{c1} \geq 55°$ C. when a high Li ion conducting phase having peaks at 2θ=20.2° and 23.6° is c1 and a low Li ion conducting phase having peaks at 2θ=21.0° and 28.0° is cx in an X-ray diffraction measurement using a CuKα ray, and temperature of an exothermic peak of the c1 is $T_{c1}$ and temperature of an exothermic peak of the cx is $T_{cx}$ in differential thermal analysis.

According to the present invention, the difference between $T_{cx}$ and $T_{c1}$ is large, and thus it is possible to adopt a heat treatment condition that is suitable for enhancing the crystallinity of a high Li ion conducting phase. For such reasons, by using the sulfide glass of the present invention, a sulfide solid electrolyte material having a high Li ion conductivity can be obtained.

Furthermore, according to the aforementioned invention, it is preferable that the sulfide glass comprises: an ion conductor having Li, P, and S; LiI; and LiBr, characterized in that LiBr/(LiI+LiBr) is in the range of 25 mol % to 50 mol %.

Furthermore, provided by the present invention is a solid state lithium battery comprising: a cathode active material layer containing a cathode active material, an anode active material layer containing an anode active material, and a solid electrolyte layer formed between the cathode active material layer and the anode active material layer, characterized in that at least one of the cathode active material layer, the anode active material layer, and the solid electrolyte layer contains the aforementioned sulfide solid electrolyte material.

According to the present invention, a solid state lithium battery having a high Li ion conductivity can be obtained by using the sulfide solid electrolyte material that is described above. As a result, a battery with high output can be obtained.

Further, also provided by the present invention is a method for producing a sulfide solid electrolyte material, the sulfide solid electrolyte material being the sulfide solid electrolyte material mentioned above, the method comprising steps of: an amorphizing step of obtaining a sulfide glass by amorphization of the raw material composition that contains at least $Li_2S$, $P_2S_5$, and LiI; and a heat treatment step of heating the sulfide glass, characterized in that when a high Li ion conducting phase having peaks at $2\theta=20.2°$ and $23.6°$ is c1 and a low Li ion conducting phase having peaks at $2\theta=21.0°$ and $28.0°$ is cx in an X-ray diffraction measurement using a CuKα ray, and temperature of an exothermic peak of the c1 is $T_{c1}$ and temperature of an exothermic peak of the cx is $T_{cx}$ in differential thermal analysis, the sulfide glass satisfying $T_{cx}-T_{c1} \geq 55°$ C. is used.

According to the present invention, as a sulfide glass having a large difference between $T_{cx}$ and $T_{c1}$ is used, it is possible to adopt a heat treatment condition that is suitable for enhancing the crystallinity of a high Li ion conducting phase. Accordingly, a sulfide solid electrolyte material having a high Li ion conductivity can be obtained.

Advantageous Effects of Invention

The present invention exhibits an effect of allowing obtainment of a sulfide solid electrolyte material having a high Li ion conductivity.

DESCRIPTION OF EMBODIMENTS

Figure 1:
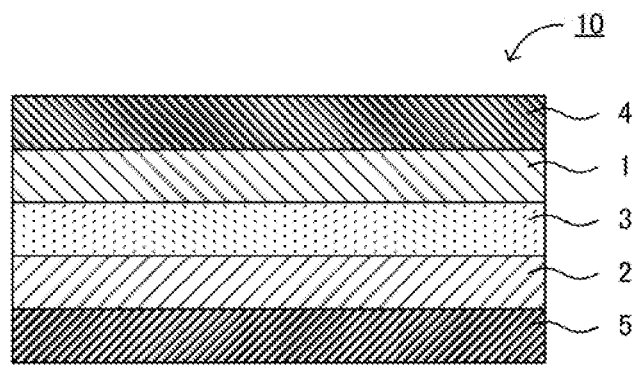
FIG. 1 is a schematic cross-sectional view illustrating an exemplary solid state lithium battery of the present invention.

Hereinbelow, the sulfide solid electrolyte material, sulfide glass, solid state lithium battery, and method producing a sulfide solid electrolyte material are described in detail.

A. Sulfide Solid Electrolyte Material

First, the sulfide solid electrolyte material of the present invention is described. The sulfide solid electrolyte material of the present invention is characterized in that it comprises Li, P, I, and S, has peaks at $2\theta=20.2°$ and $23.6°$, does not have peaks at $2\theta=21.0°$ and $28.0°$ in an X-ray diffraction measurement using a CuKα ray, and has a half width value of the peak at $2\theta=20.2°$ of $0.51°$ or less.

According to the present invention, by containing a high Li ion conducting phase having peaks at $2\theta=20.2°$ and $23.6°$ and also having high crystallinity, a sulfide solid electrolyte material with a high Li ion conductivity can be provided. Furthermore, also by not containing any low Li conducting phase having peaks at $2\theta=21.0°$ and $28.0°$, a sulfide solid electrolyte material having a high Li ion conductivity can be provided according to the present invention.

As described above, when the heat treatment temperature is increased or the heat treatment time is extended in order to increase the crystallinity of a high Li ion conducting phase, a low Li ion conducting phase is generated so that it is difficult to increase the Li ion conductivity. Furthermore, when the heat treatment is carried out under a condition such that a low Li ion conducting phase is not generated, the crystallinity of a high Li ion conducting phase cannot be increased. For such reasons, it is also difficult for the case to have increased Li ion conductivity.

As described above, it is difficult to increase the crystallinity of a high Li ion conducting phase while suppressing the generation of a low Li ion conducting phase, and it is believed that such difficulty is caused by precipitation temperature ranges of both conducting phases being close to each other. Meanwhile, it was found in the present invention that the exothermic peak of a low Li ion conducting phase can be shifted to a high temperature side. Accordingly, a milder condition for heat treatment can be used so that the crystallinity of a high Li ion conducting phase can be increased while suppressing the generation of a low Li ion conducting phase.

The sulfide solid electrolyte material of the present invention comprises Li, P, I, and S and it may further comprise at least one of Br and Cl. The type of elements constituting the sulfide solid electrolyte material of the present invention can be determined by ICP spectrophotometry analyzer, for example.

Furthermore, the sulfide solid electrolyte material obtained by the present invention has peaks at $2\theta=20.2°$ and $23.6°$ in an X-ray diffraction measurement using a CuKα ray. Those peaks are the peak of a crystal phase with a high Li ion conductivity. Incidentally, the crystal phase may be referred to as a high Li ion conducting phase. As described herein, the peak at $2\theta=20.2°$ indicates not only the peak precisely at $2\theta=20.2°$ but also a peak in the range of $2\theta=20.2°\pm0.5°$. It is defined like that since the peak position may be slightly different depending on the state of a crystal. Similarly, the peak at $2\theta=23.6°$ indicates not only the peak precisely at $2\theta=23.6°$ but also a peak in the range of with $2\theta=23.6°\pm0.5°$. Furthermore, the high Li ion conducting phase generally has peaks at $2\theta=29.4°$, $37.8°$, $41.1°$, and $47.0°$, in addition to $2\theta=20.2°$ and $23.6°$. Those peak positions may be also slightly different within the range of $\pm0.5°$. Furthermore, in particular, the sulfide solid electrolyte material of the present invention preferably has only the peak of a high Li ion conducting phase, that is, it has a single phase of a high Li ion conducting phase, because a sulfide solid electrolyte material having a high Li ion conductivity can be provided accordingly.

Furthermore, the sulfide solid electrolyte material obtained by the present invention does not have peaks at $2\theta=21.0°$ and $28.0°$ in an X-ray diffraction measurement using a CuKα ray. The crystal phase having those peaks relates to a peak of a crystal phase which has lower Li ion conductivity than the high Li ion conducting phase. Incidentally, this crystal phase may be referred to as a low Li ion conducting phase. As described herein, the peak at $2\theta=21.0°$ indicates not only the peak precisely at $2\theta=21.0°$ but also a peak in the range of $2\theta=21.0°\pm0.5°$. It is defined like that since the peak position may be slightly different depending on the state of a crystal. Similarly, the peak at $2\theta=28.0°$ indicates not only the peak precisely at $2\theta=28.0°$ but also a peak in the range of with $2\theta=28.0°\pm0.5°$. Furthermore, the low Li ion conducting phase generally has peaks at $2\theta=32.0°$, $33.4°$, $38.7°$, $42.8°$, and $44.2°$, in addition to $2\theta=21.0°$ and $28.0°$. Those peak positions may be also slightly different within the range of $\pm0.5°$.

Furthermore, the expression "does not have peaks at $2\theta=21.0°$ and $28.0°$" described in the present invention indicates that no peak is determined at $2\theta=21.0°$ and $28.0°$, or the peak intensity at $2\theta=20.2°$ relative to the peak intensity at $2\theta=21.0°$, that is, $I_{20.2}/I_{21.0}$, is 2.5 or more. $I_{20.2}/I_{21.0}$ is preferably 5 or more, and more preferably 10 or more. Incidentally, $I_{21.0}/I_{20.2}$ is preferably 0.4 or less, preferably 0.2 or less, and more preferably 0.1 or less. Meanwhile, $I_{21.0}/I_{20.2}$ has an inverse relationship with $I_{20.2}/I_{21.0}$.

Furthermore, the sulfide solid electrolyte material obtained by the present invention preferably has a half width of the peak at $2\theta=20.2°$, which corresponds to the peak of a high Li ion conducting phase of $0.51°$ or less, preferably $0.50°$ or less, more preferably $0.45°$ or less, even more preferably $0.44°$ or less, and particularly preferably $0.43°$ or less. As described herein, the half width means full width half maximum (FWHM) of the peak at $2\theta=20.2°$.

The sulfide solid electrolyte material of the present invention has a peak of a high Li ion conducting phase, does not have a peak of a low Li ion conducting phase, and has a predetermined half width value. The sulfide solid electrolyte material obtained by the present invention is generally glass ceramics. The glass ceramics indicates a material obtained by crystallization of sulfide glass. The glass ceramics can be confirmed by X-ray diffraction, for example. Furthermore, the sulfide glass indicates a material synthesized by amorphization of a raw material composition, and it indicates not only the "glass" in the strict sense that is not observed with any periodic feature of a crystal according to X-ray diffraction but also any material that is synthesized by amorphization based on mechanical milling or the like that is described below. For such reasons, even when a peak derived from the raw material (LiI or the like) is observed by X-ray diffraction measurement or the like, it can be a sulfide glass if it is synthesized by amorphization.

Furthermore, the sulfide solid electrolyte material obtained by the present invention preferably comprises an ion conductor having Li, P, and S and at least one of LiI, LiBr and LiCl. At least part of LiI, LiBr and LiCl is present as, each as a LiI component, LiBr component, and LiCl component, being introduced to a structure of an ion conductor. Furthermore, the sulfide solid electrolyte material obtained by the present invention may or may not have a LiI peak according to X-ray diffraction measurement. However, it preferably has a LiI peak, because Li ion conductivity is high. The same applies to LiBr and LiCl.

According to the present invention, the ion conductor has Li, P, and S. The ion conductor is not particularly limited if it has Li, P, and S. However, it is preferably an ion conductor having an ortho composition, because a sulfide solid electrolyte material with high chemical stability can be provided. As described herein, the ortho means, among oxo acids that are obtained by hydration of same oxides, the oxo acid having the highest hydration level. In the present invention, the crystal composition having $Li_2S$ added to a sulfide is referred to as an ortho composition. For example, in the $Li_2S$—$P_2S_5$ system, $Li_3PS_4$ corresponds to the ortho composition.

Furthermore, as described herein, the expression "has an ortho composition" means not only the ortho composition in the strict sense but also a composition close to it. Specifically, it indicates a composition in which an anion structure ($PS_4^{3-}$ structure) of an ortho composition is included as a main component. The ratio of the anion structure of an ortho composition is preferably 60 mol % or more, more preferably 70 mol % or more, even more preferably 80 mol % or more, and particularly preferably 90 mol % or more, relative to the entire anion structure of an ion conductor. Incidentally, the ratio of the anion structure of an ortho composition can be determined by Raman spectroscopy, NMR, XPS, or the like.

Furthermore, it is preferable that the sulfide solid electrolyte material obtained by the present invention does not substantially contain $Li_2S$, because a sulfide solid electrolyte material with less production amount of hydrogen sulfide can be provided. As $Li_2S$ reacts with water, hydrogen sulfide is produced. For example, when the ratio of $Li_2S$ contained in the raw material composition is high, it is easy to have residual $Li_2S$. "Does not substantially contain $Li_2S$" can be confirmed by X-ray diffraction. Specifically, when there is no peak of $Li_2S$ ($2\theta=27.0°$, $31.2°$, $44.8°$, and $53.1°$), it can be determined that $Li_2S$ is substantially not contained.

Furthermore, it is preferable that the sulfide solid electrolyte material obtained by the present invention does not substantially contain cross-linking sulfur, because a sulfide solid electrolyte material with less production amount of hydrogen sulfide can be provided. The term "cross-linking sulfur" means cross-linking sulfur in a compound that is obtained by a reaction between $Li_2S$ and $P_2S_5$. For example, it is cross-linking sulfur with $S_3P$—S—$PS_3$ structure which is obtained by reaction between $Li_2S$ and $P_2S_5$. Such cross-linking sulfur easily reacts water so that hydrogen sulfide can be easily produced. When the ratio of $Li_2S$ contained in the raw material composition is low, the cross-linking sulfur may easily occur. "Does not substantially contain cross-linking sulfur" can be confirmed by measurement of Raman spectrophotometric spectrum. For example, in case of a $Li_2S$—$P_2S_5$-based sulfide solid electrolyte material, the peak of $S_3P$—S—$PS_3$ structure generally appears at 402 cm$^{-1}$. For such reasons, it is preferable that this peak is not detected. Furthermore, the peak of $PS_4^{3-}$ structure generally appears at 417 cm$^{-1}$. In the present invention the intensity at 402 cm$^{-1}$, that is, $I_{402}$, is preferably smaller than the intensity at 417 cm$^{-1}$, that is, $I_{417}$. Specifically, the intensity $I_{402}$ relative to the intensity $I_{417}$ is preferably 70% or less, for example. It is more preferably 50% or less, and even more preferably 35% or less.

Furthermore, in case of $Li_2S$—$P_2S_5$-based sulfide solid electrolyte material, the ratio of $Li_2S$ and $P_2S_5$ for obtaining the ortho composition is, in terms of molar base, $Li_2S$:$P_2S_5$=75:25. Moreover, the ratio of $Li_2S$ relative to the total of $Li_2S$ and $P_2S_5$ is preferably in the range of 70 mol % to 80 mol %, more preferably in the range of 72 mol % to 78 mol %, and even more preferably in the range of 74 mol % to 76 mol %.

Furthermore, the ratio of LiX (X=I, Cl, Br) in the sulfide solid electrolyte material of the present invention is not particularly limited, if a desired sulfide solid electrolyte material can be obtained. However, it is preferably in the range of 10 mol % to 30 mol %, and more preferably 15 mol % to 25 mol %. Incidentally, the ratio of LiX indicates the ratio of entire LiX contained in the sulfide solid electrolyte material. For example, if the sulfide solid electrolyte material contains LiI only, the ratio of LiX indicates the ratio of LiI. Furthermore, if the sulfide solid electrolyte material contains plural LiX such as LiI and LiBr, the ratio of LiX indicates the ratio of plural LiX in total. Incidentally, when the sulfide solid electrolyte material has composition of aLiX.(1−a)(b$Li_2S$.(1−b)$P_2S_5$), "a" corresponds to the ratio of LiX and "b" corresponds to the $Li_2S$ ratio.

Furthermore, the sulfide solid electrolyte material of the present invention preferably uses a raw material composition containing at least $Li_2S$, $P_2S_5$ and LiI. Furthermore, the raw material composition may also contain at least one of LiBr and LiCl. Furthermore, the sulfide solid electrolyte material of the present invention is preferably obtained by forming a sulfide glass based on amorphization of a raw material composition and performing a heat treatment of the sulfide glass.

In particular, the sulfide glass is preferably a material satisfying $T_{cx}-T_{c1}\geq 55°$ C., when the high Li ion conducting phase is c1, the low Li ion conducting phase is cx, and, in differential thermal analysis, temperature of the exothermic peak of c1 is $T_{c1}$ and temperature of the exothermic peak of cx is $T_{cx}$, because a sulfide solid electrolyte material with a high Li ion conductivity can be obtained. Furthermore, the differential thermal analysis is generally performed at the following conditions. Namely, a TG-DTA device (for example, Thermo plus EVO™, manufactured by Rigaku Corporation) is used, a sample dish made of aluminum is used, and α-$Al_2O_3$ powder is used as a reference sample. About 20 mg to 26 mg of a measurement sample is used, and the temperature is raised at 10° C./min or so from room temperature to 400° C. under Ar gas atmosphere.

The value of $T_{cx}-T_{c1}$ is preferably 60° C. or higher, and more preferably 70° C. or higher. The value of $T_{cx}$ is, although it may vary depending on the composition, preferably 230° C. or higher, and more preferably 260° C. or higher. Furthermore, the value of $T_{c1}$ is generally 170° C. to 200° C. or so. Furthermore, in the present invention, the peak of $T_{c1}$ and the peak of $T_{cx}$ are not generally overlapped with each other. Specifically, it is preferable that the temperature at peak top on the high temperature side of $T_{c1}$ is sufficiently apart from the temperature at peak top on the low temperature side of $T_{cx}$. Specifically, the difference between them is preferably 40° C. or higher, and more preferably 50° C. or higher.

Furthermore, as described in the below Examples, there can be a case in which the exothermic peak of $T_{cx}$ is overlapped with other large exothermic peak, which is considered to be an exothermic peak of other crystal phase, specifically, a crystal phase of β-$Li_3PS_4$. In the present invention, temperature of the exothermic peak of the crystal phase of β-$Li_3PS_4$ may be referred to as $T_{c2}$. In the present invention, when the exothermic peak of $T_{cx}$ is overlapped with the exothermic peak of $T_{c2}$, $T_{c2}$ can be approximately used as $T_{cx}$. In that case, the value of $T_{cx}-T_{c1}$ can be approximated to the value of $T_{c2}-T_{c1}$, for example.

For a case in which the sulfide solid electrolyte material contains LiI and LiBr, the ratio of LiBr relative to the total of LiI and LiBr (LiBr/(LiI+LiBr)) is not particularly limited and any ratio can be employed. Although the LiBr ratio is not particularly limited, it is preferably a ratio allowing the obtainment of Li ion conductivity which is equal to or higher than that of the sulfide solid electrolyte material which has been produced in the same manner except that it has composition in which LiBr is replaced with LiI (that is, sulfide solid electrolyte material as a subject for comparison). More preferably, it is a ratio allowing obtainment of higher Li ion conductivity than the sulfide solid electrolyte material as a subject for comparison. The LiBr ratio is in the range of 1 mol % to 99 mol %, for example, and preferably in the range of 5 mol % to 75 mol %. The LiBr ratio is particularly preferably in the range of 25 mol % to 50 mol %, because a larger difference between $T_{cx}$ and $T_{c1}$ can be obtained. Although it is not necessarily clear, it is believed that the mechanism involved thereto is as follows: as part of the I is replaced with Br having a smaller ionic radius, it becomes difficult to have a good match with the crystal structure of a low Li ion conducting phase.

For a case in which the sulfide solid electrolyte material contains LiI and LiCl, the ratio of LiCl relative to the total of LiI and LiCl (LiCl/(LiI+LiCl)) is not particularly limited and any ratio can be employed. Although the LiCl ratio is not particularly limited, it is preferably a ratio allowing the obtainment of Li ion conductivity which is equal to or higher than that of the sulfide solid electrolyte material which has been produced in the same manner except that it has composition in which LiCl is replaced with LiI (that is, sulfide solid electrolyte material as a subject for comparison). More preferably, it is a ratio allowing obtainment of higher Li ion conductivity than the sulfide solid electrolyte material as a subject for comparison. The LiCl ratio is in the range of 1 mol % to 99 mol %, for example, and preferably in the range of 5 mol % to 75 mol %. The LiCl ratio is particularly preferably in the range of 15 mol % to 50 mol %, because a larger difference between $T_{cx}$ and $T_{c1}$ can be obtained. Although it is not necessarily clear, it is believed that the mechanism involved thereto is as follows: as part of the I is replaced with Cl having a smaller ionic radius, it becomes difficult to have a good match with the crystal structure of a low Li ion conducting phase.

Furthermore, for a case in which the sulfide solid electrolyte material uses a raw material composition containing at least $Li_2S$, $P_2S_5$ and LiI, the ratio of $Li_2S$ relative to the total of $Li_2S$ and $P_2S_5$ ($Li_2S/(Li_2S+P_2S_5)$) is preferably in the range of 76 mol % to 78 mol %, because a larger difference between $T_{cx}$ and $T_{c1}$ can be obtained. Although it is not necessarily clear, it is believed that the mechanism involved thereto is as follows: by having a composition in which $Li_2S$ is slightly excessive compared to $PS_4$ unit, an interaction occurs between LiI and $Li_2S$ so that a state not easily allowing the crystal structure of a low Li ion conducting phase is yielded.

Examples of the shape of the sulfide solid electrolyte material which is obtained by the present invention include a particulate shape. The average particle diameter ($D_{50}$) of a particulate sulfide solid electrolyte material is preferably in the range of 0.1 μm to 50 μm. Moreover, the Li ion conductivity of the sulfide solid electrolyte material is preferably as high as possible. The Li ion conductivity at room temperature is preferably $1\times10^{-4}$ S/cm or more, and more preferably $1\times10^{-3}$ S/cm or more.

The sulfide solid electrolyte material obtained by the present invention can be used for any application in which the Li ion conductivity is required. In particular, the sulfide solid electrolyte material is preferably used for a battery.

B. Sulfide Glass

Next, the sulfide glass of the present invention is described. The sulfide glass of the present invention comprises Li, P, I, Br, and S, and satisfies the relationship of $T_{cx}-T_{c1} \geq 55°$ C. when the high Li ion conducting phase having peaks at $2\theta=20.2°$ and $23.6°$ is c1 and the low Li ion conducting phase having peaks at $2\theta=21.0°$ and $28.0°$ is cx in an X-ray diffraction measurement using a CuKα ray, and temperature of the exothermic peak of c1 is $T_{c1}$ and temperature of the exothermic peak of cx is $T_{cx}$ in differential thermal analysis.

According to the present invention, the difference between $T_{cx}$ and $T_{c1}$ is large, and thus it is possible to adopt a heat treatment condition that is suitable for enhancing the crystallinity of a high Li ion conducting phase. For such reasons, by using the sulfide glass of the present invention, a sulfide solid electrolyte material having a high Li ion conductivity can be obtained. Incidentally, the sulfide glass of the present invention is the same as the contents described in "A. Sulfide solid electrolyte material", and thus further descriptions are omitted herein.

C. Solid State Lithium Battery

Next, the solid state lithium battery of the present invention is described. FIG. 1 is a schematic cross-sectional view illustrating an exemplary solid state lithium battery of the present invention. A solid state lithium battery 10 shown in FIG. 1 comprises a cathode active material layer 1 containing a cathode active material, an anode active material layer 2 containing an anode active material, a solid electrolyte layer 3 formed between the cathode active material layer 1 and the anode active material layer 2, a cathode current collector 4 for current collecting in the cathode active material layer 1, and an anode current collector 5 for current collecting in the anode active material layer 2. The most important characteristic of the present invention is that at least one of the cathode active material layer 1, the anode active material layer 2, and the solid electrolyte layer 3 contains a sulfide solid electrolyte material that is described in "A. Sulfide solid electrolyte material" above.

According to the present invention, a solid state lithium battery having a high Li ion conductivity can be provided by using the aforementioned sulfide solid electrolyte material. Accordingly, a battery with high output can be provided.

Hereinbelow, each constitution of the solid state lithium battery of the present invention is described.

1. Cathode Active Material Layer

First, the cathode active material layer of the present invention is described. The cathode active material layer of the present invention is a layer which contains at least a cathode active material, and it may further contain at least one of a solid electrolyte material, a conductive material, and a binder.

In the present invention, the solid electrolyte material contained in the cathode active material layer is preferably the sulfide solid electrolyte material which has been described in "A. Sulfide solid electrolyte material" above. Content of the sulfide solid electrolyte material in the cathode active material layer is preferably in the range of 0.1% by volume to 80% by volume, more preferably in the range of 1% by volume to 60% by volume, and particularly preferably in the range of 10% by volume to 50% by volume.

The cathode active material is not particularly limited. However, examples thereof include a rock salt layer type active material such as $LiCoO_2$, $LiMnO_2$, $LiNiO_2$, $LiVO_2$, and $LiNi_{1/3}Co_{1/3}Mn_{1/3}O_2$, a spinel type active material such as $LiMn_2O_4$ and $Li(Ni_{0.5}Mn_{1.5})O_4$, and an olivine type active material such as $LiFePO_4$, $LiMnPO_4$, $LiNiPO_4$, and $LiCuPO_4$. Furthermore, a Si-containing oxide such as $Li_2FeSiO_4$ and $Li_2MnSiO_4$ can also be used as a cathode active material.

As for the shape of a cathode active material, a particulate shape can be mentioned, for example. In particular, a true spherical shape or an elliptical shape is preferable. In addition, when the cathode active material has a particulate shape, the average particle diameter is preferably in the range of 0.1 μm to 50 μm, for example. Furthermore, content of the cathode active material in the cathode active material layer is preferably in the range of 10% by volume to 99% by volume, and more preferably in the range of 20% by volume to 99% by volume.

The cathode active material layer of the present invention may further contain at least one of a conductive material and a binder, in addition to the cathode active material and solid electrolyte material. Examples of the conductive material include acetylene black, ketjen black, and carbon fiber. Examples of the binder include a fluorine-containing binder like PTFE and PVDF. Thickness of the cathode active material layer is preferably in the range of 0.1 μm to 1000 μm, for example.

2. Anode Active Material Layer

Next, the anode active material layer of the present invention is described. The anode active material layer of the present invention is a layer which contains at least an anode active material, and it may further contain at least one of a solid electrolyte material, a conductive material, and a binder.

In the present invention, the solid electrolyte material contained in the anode active material layer is preferably the sulfide solid electrolyte material which has been described in "A. Sulfide solid electrolyte material" above. Content of the sulfide solid electrolyte material in the anode active material layer is preferably in the range of 0.1% by volume to 80% by volume, more preferably in the range of 1% by volume to 60% by volume, and particularly preferably in the range of 10% by volume to 50% by volume.

Examples of the anode active material include a metal active material and a carbon active material. Examples of the metal active material include In, Al, Si, and Sn. Meanwhile, examples of the carbon active material include mesocarbon micro beads (MCMB), highly-oriented pyrolytic graphite (HOPG), hard carbon, and soft carbon. Content of the anode active material in the anode active material layer is preferably in the range of 10% by volume to 99% by volume, and more preferably in the range of 20% by volume to 99% by volume. Incidentally, the conductive material and binder are the same as those used for the cathode active material layer that is described above. Thickness of the anode active material layer is preferably in the range of 0.1 μm to 1000 μm, for example.

3. Solid Electrolyte Layer

Next, the solid electrolyte layer of the present invention is described. According to the present invention, the solid electrolyte layer is a layer formed between the cathode active material layer and the anode active material layer, and it is a layer constituted from a solid electrolyte material. The solid electrolyte material contained in the solid electrolyte layer is not particularly limited, if it has a Li ion conductivity.

In the present invention, the solid electrolyte material to be contained in a solid electrolyte layer is preferably the sulfide solid electrolyte material which has been described in "A. sulfide solid electrolyte material" above. Content of the sulfide solid electrolyte material in a solid electrolyte layer is not particularly limited, if the ratio allows obtainment of a desired insulating property is obtained. It is preferably, however, in the range of 10% by volume to 100% by volume, and particularly in the range of 50% by volume to 100% by volume. In the present invention, it is preferable that the solid electrolyte layer is constituted only from the aforementioned sulfide solid electrolyte material, in particular.

The solid electrolyte layer may also contain a binder, because a solid electrolyte layer having flexibility can be obtained by containing a binder. As for the binder, the binder used for the aforementioned cathode active material layer can also be used. Thickness of the solid electrolyte layer is preferably in the range of 0.1 μm to 1000 μm, particularly in the range of 0.1 μm to 300 μm.

4. Other Constitutions

The solid state lithium battery of the present invention comprises at least the cathode active material layer, anode active material layer, and solid electrolyte layer that are described above. More typically, it has a cathode current collector for current collecting in the cathode active material layer and an anode current collector for current collecting in the anode active material layer. Examples of the material of the cathode current collector include SUS, aluminum, nickel, iron, titan, and carbon. Examples of the material of the anode current collector include SUS, copper, nickel, and carbon. Furthermore, it is preferable that thickness or shape of the cathode current collector and anode current collector is suitably selected depending on factors such as the use of a solid state lithium battery. Furthermore, as for the battery casing used for the present invention, a battery casing for a common solid state lithium battery can be used. Examples of the battery casing include a battery casing made of SUS.

5. Solid State Lithium Battery

The solid state lithium battery of the present invention may be either a primary battery or a secondary battery. In particular, the secondary battery is preferable because it allows repeated charge and discharge and is useful as a battery for mounting on an automobile, for example. Examples of the shape of the solid state lithium battery of the present invention include a coin shape, a laminate shape, a cylinder shape, and a square shape.

Furthermore, the method for producing a solid state lithium battery of the present invention is not particularly limited, if it allows obtainment of the aforementioned solid state lithium battery described above, and the same method as the common method for producing a solid state lithium battery can be used. Examples of the method for producing a solid state lithium battery include a method in which a power generating element is produced by pressing in order the material constituting a cathode active material layer, the material constituting a solid electrolyte layer, and the material constituting an anode active material layer, the obtained power generating element is accommodated in a battery casing, and the battery casing is tightly fixed.

D. Method for Producing Sulfide Solid Electrolyte Material

Figure 2:
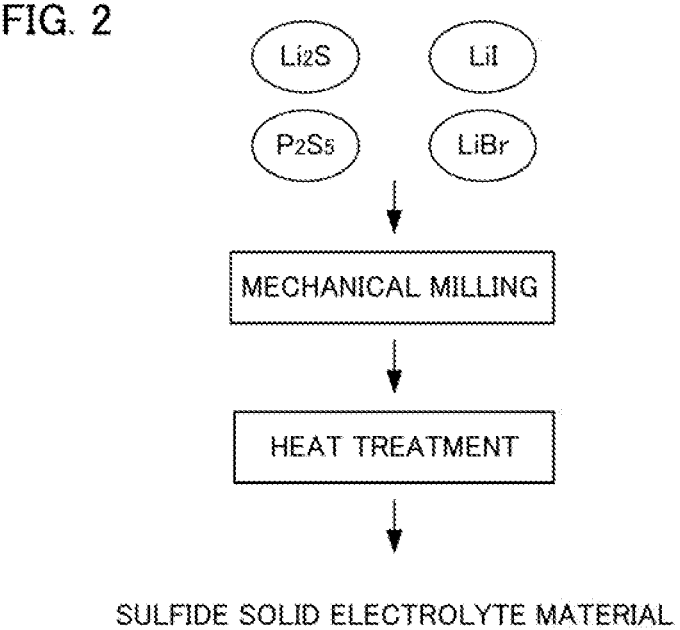
FIG. 2 is a flowchart illustrating an exemplary method for producing a sulfide solid electrolyte material of the present invention.

Next, the method for producing a sulfide solid electrolyte material of the present invention is described. FIG. 2 is a flowchart illustrating an exemplary method for producing a sulfide solid electrolyte material of the present invention. With regard to FIG. 2, a raw material composition containing $Li_2S$, $P_2S_5$, LiI, and LiBr is prepared first. Then, by performing a mechanical milling of the raw material composition, a sulfide glass comprising an ion conductor containing Li, P, and S (for example, $Li_3PS_4$) and LiI and LiBr is synthesized. Thereafter, the sulfide glass is subjected to a heat treatment to obtain a desired sulfide solid electrolyte material. The method for producing a sulfide solid electrolyte material of the present invention is highly characterized in that a sulfide glass satisfying $T_{cx}-T_{c1} \geq 55°$ C. is used. By selecting the heat treatment temperature and heat treatment time of the sulfide glass in consideration of $T_{cx}$ and $T_{c1}$, a desired sulfide solid electrolyte material can be obtained.

According to the present invention, by using a sulfide glass having a large difference between $T_{cx}$ and $T_{c1}$, the heat treatment conditions suitable for enhancing the crystallinity of a high Li ion conducting phase can be employed. As a result, a sulfide solid electrolyte material with high Li ion conductivity can be obtained.

Hereinbelow, each step of the method for producing a sulfide solid electrolyte material of the present invention is described.

1. Amorphizing Step

According to the present invention, the amorphizing step is a step of obtaining a sulfide glass by amorphization of a raw material composition containing at least $Li_2S$, $P_2S_5$ and LiI.

With regard to $Li_2S$, $P_2S_5$ and LiI in the raw material composition, no further descriptions are given herein because the same descriptions as those described in above "A. sulfide solid electrolyte material" are applied.

As a method for amorphization of a raw material composition, a mechanical milling and a melt quenching method can be mentioned. Among them, the mechanical milling is preferable in that the production process can be simplified as the treatment can be performed at room temperature. Furthermore, while the melt quenching method is limited in terms of reaction atmosphere or reaction vessel, the mechanical milling has an advantage that a sulfide glass with desired composition can be conveniently synthesized. The mechanical milling can be either a dry mechanical milling or a wet mechanical milling, but the latter is preferable, because adhesion of a raw material composition on a wall surface of a vessel or the like is prevented so that a sulfide glass with even higher amorphous nature can be obtained.

The mechanical milling is not particularly limited if the raw material composition is mixed with application of mechanical energy. Examples thereof include a ball mill, a vibrating mill, a turbo mill, a mechanofusion, and a disc mill. Among them, it is preferably a ball mill, and a planetary ball mill is particularly preferable because a desired sulfide glass can be efficiently obtained.

Furthermore, various conditions for the mechanical milling are set to have a desired sulfide glass. For example, when a planetary ball mill is used, a raw material composition and crusher balls are added to a vessel and the treatment is performed at a predetermined revolution number and time. In general, the production rate of a sulfide glass increases as the revolution number increases, and the conversion rate from the raw material composition to a sulfide glass increases as the treatment time increases. As for the revolution number of a large tray for running a planetary ball mill, it is in the range of 200 rpm to 500 rpm, and particularly preferably in the range of 250 rpm to 400 rpm. Furthermore, as for the treatment time for running a planetary ball mill, it is in the range of 1 hour to 100 hours, and particularly in the range of 1 hour to 50 hours. Furthermore, as for the material of a vessel used for a ball mill and crusher balls, $ZrO_2$ and $Al_2O_3$ can be mentioned, for example. Furthermore, the diameter of a crusher ball is in the range of 1 mm to 20 mm, for example.

With regard to a liquid used for a wet mechanical milling, a liquid having a property of not generating hydrogen sulfide upon reaction with the raw material composition is preferable. Hydrogen sulfide is generated as the protons dissociated from a liquid molecule react with the raw material composition or sulfide glass. For such reasons, it is preferable that the liquid has an aprotic property to the extent that it does not generate any hydrogen sulfide. Furthermore, the aprotic liquid can be generally classified into a polar aprotic liquid and a non-polar aprotic liquid.

Examples of the a polar aprotic liquid include, although not particularly limited, ketones such as acetone; nitriles such as acetonitrile; amides such as N,N-dimethyl formamide (DMF); and sulfoxides such as dimethyl sulfoxide (DMSO).

Examples of the non-polar aprotic liquid include an alkane which is present as a liquid at room temperature (25° C.). The alkane may be either a chain type alkane or a cycle type alkane. The carbon atom number of the chain type alkane is preferably 5 or more, for example. The upper limit of the carbon atom number of the chain type alkane is not particularly limited, if it is present as a liquid at room temperature. Specific examples of the chain type alkane include pentane, hexane, heptane, octane, nonane, decane, undecane, dodecane, and paraffin. Incidentally, the chain type alkane may also have a branch. Meanwhile, specific examples of the cycle type alkane include cyclopentane, cyclohexane, cycloheptane, cyclooctane, and cycloparaffin.

Furthermore, other examples of the non-polar aprotic liquid include aromatic hydrocarbons such as benzene, toluene, and xylene; chain type ethers such as diethyl ether and dimethyl ether; cyclic ethers such as tetrahydrofuran; halogenated alkyls such as chloroform, methyl chloride, and methylene chloride; esters such as ethyl acetate; and fluorine-based compounds such as fluorobenzene, fluoroheptane, 2,3-dihydroperfluoropentane, and 1,1,2,2,3,3,4-heptafluorocyclopentane. Incidentally, the addition amount of the liquid is not particularly limited, and it can be an amount which allows obtainment of a desired sulfide solid electrolyte material.

2. Heat Treatment Step

Next, the heat treatment step of the present invention is described. In the present invention, the heat treatment step is a step of heating the sulfide glass.

The heat treatment temperature and heat treatment time for the heat treatment step are determined by fully considering $T_{cx}$ and $T_{c1}$ of the sulfide glass. When the heat treatment time is relatively short, for example, less than 10 hours, the heat treatment is preferably performed, in consideration of $T_{cx}$, at the highest temperature at which generation of a low Li ion conducting phase is prevented. In that case, the upper limit of the heat treatment temperature can be $(T_{cx}-50)°$ C., for example. The lower limit of the heat treatment temperature can be $(T_{c1}-10)°$ C., for example.

Meanwhile, when the heat treatment time is relatively long, for example 10 hours or longer, it is preferable to perform the heat treatment, considering $T_{c1}$, at a temperature that is close to $T_{c1}$. If the difference between $T_{cx}$ and $T_{c1}$ is small, a low Li ion conducting phase can be produced under long heat treatment time even when the heat treatment is performed at a temperature that is close to $T_{c1}$. On the contrary, if the difference between $T_{cx}$ and $T_{c1}$ is large, a low Li ion conducting phase is not produced even when the heat treatment is performed for a long time at a temperature which is close to $T_{c1}$. In addition, the crystallinity of a high Li ion conducting phase can be increased by performing the heat treatment for a long time. In that case, the upper limit of the heat treatment temperature can be $(T_{c1}+5°$ C.), for example. It can be a temperature which is lower than $T_{c1}$. The lower limit of the heat treatment temperature can be $(T_{c1}-20°$ C.), for example.

Incidentally, the heat treatment time is generally in the range of 1 minute to 100 hours. Furthermore, it is preferable that the heat treatment is performed in an inert gas atmosphere (for example, Ar gas atmosphere) or in a reduced pressure atmosphere (in particular, vacuum), because the deterioration of the sulfide solid electrolyte (for example, oxidation) can be prevented. Although it is not particularly limited, examples of the heat treatment method include a method of using a calcination furnace.

Incidentally, the present invention is not limited to the above-mentioned embodiments. The above-mentioned embodiments are just an exemplification, and any is included in the technical scope of the present invention if it has substantially the same constitution as the technical idea described in the claims of the present invention and exhibits the same working effects as the present invention.

EXAMPLES

Hereinbelow, the present invention is more specifically described by way of examples. Incidentally, unless specifically described otherwise, each operation such as weighing, synthesis, or drying is performed under Ar atmosphere.

Comparative Example 1-1

$Li_2S$ (manufactured by Nippon Chemical Industrial Co., Ltd.), $P_2S_5$ (manufactured by Sigma-Aldrich Co. LLC.) and LiI (manufactured by NIPPOH CHEMICALS CO., LTD.) were used as a starting material. Weighed were 0.558 g of $Li_2S$, 0.900 g of $P_2S_5$, and 0.542 g of LiI and admixed with each other for 5 minutes using a mortar and pestle. The mixture was added to a vessel of a planetary ball mill (45 cc, made of ZrO$_2$), and after adding dehydrated heptane (moisture amount of 30 ppm or less, 4 g) and additionally adding ZrO$_2$ ball (φ=5 mm, 53 g), the vessel was completely sealed. The vessel was mounted on a planetary ball milling machine (P7™ manufactured by Fritsch Japan Co., Ltd.) to perform mechanical milling for 20 hours at the number of weighing table revolutions of 500 rpm. Thereafter, it was dried for 1 hour at 110° C. to remove heptane, thereby obtaining a sulfide glass. Incidentally, the composition is 20LiI.80 (0.75Li$_2$S.0.25P$_2$S$_5$) in terms of molar expression, and this composition is designated as composition A.

Next, 0.5 g of the obtained sulfide glass was sealed in a quartz tube under vacuum and then subjected to a heat treatment at 170° C. Specifically, the sample was added to a furnace which has been previously maintained at 170° C. and subjected to a heat treatment for 3 hours to obtain a sulfide solid electrolyte material as glass ceramics.

Comparative Example 1-2

A sulfide solid electrolyte material was obtained in the same manner as Comparative Example 1-1 except that the heat treatment temperature was set at 180° C.

Comparative Example 1-3

A sulfide solid electrolyte material was obtained in the same manner as Comparative Example 1-1 except that the heat treatment temperature was set at 190° C.

Comparative Example 1-4

A sulfide solid electrolyte material was obtained in the same manner as Comparative Example 1-1 except that the heat treatment temperature was set at 200° C.

Example 1-1

A sulfide solid electrolyte material was obtained in the same manner as Comparative Example 1-1 except that, 0.572 g of Li$_2$S, 0.922 g of P$_2$S$_5$, 0.416 g of LiI, and 0.09 g of LiBr are used such that Li$_2$S (manufactured by Nippon Chemical Industrial Co., Ltd.), P$_2$S$_5$ (manufactured by Sigma-Aldrich Co. LLC), LiI (manufactured by NIPPOH CHEMICALS CO., LTD.) and LiBr (manufactured by Kojundo Chemical Laboratory Co., Ltd.) were used as starting materials, and the heat treatment temperature was set at 185° C. Incidentally, the composition is 15LiI.5LiBr.80(0.75Li$_2$S.0.25P$_2$S$_5$) in terms of molar expression, and this composition is designated as composition B.

Example 1-2

A sulfide solid electrolyte material was obtained in the same manner as Example 1-1 except that the heat treatment temperature was set at 195° C.

Example 1-3

A sulfide solid electrolyte material was obtained in the same manner as Example 1-1 except that, 0.580 g of Li$_2$S, 0.936 g of P$_2$S$_5$, 0.338 g of LiI, and 0.146 g of LiBr are used such that Li$_2$S (manufactured by Nippon Chemical Industrial Co., Ltd.), P$_2$S$_5$ (manufactured by Sigma-Aldrich Co. LLC), LiI (manufactured by NIPPOH CHEMICALS CO., LTD.) and LiBr (manufactured by Kojundo Chemical Laboratory Co., Ltd.) were used as starting materials, and the heat treatment temperature was set at 195° C. Incidentally, the composition is 12LiI.8LiBr.80(0.75Li$_2$S.0.25P$_2$S$_5$) in terms of molar expression, and this composition is designated as composition C.

Example 1-4

A sulfide solid electrolyte material was obtained in the same manner as Example 1-3 except that the heat treatment temperature was set at 205° C.

[Evaluation 1]

(DTA Measurement)

DTA analysis was performed for the sulfide glass with the compositions A to C. For the measurement, a TG-DTA apparatus (Thermo plus EVO™, manufactured by Rigaku Corporation) was used. An aluminum sample dish was used and α-Al$_2$O$_3$ powder was used as a reference sample. The measurement sample was used in an amount of 20 mg to 26 mg, and after raising the temperature from room temperature to 400° C. at 10° C./min under Ar gas atmosphere, the DTA analysis was performed. Incidentally, peak values of an exothermic peak were read in the present invention. The results are shown in FIG. 3 and Table 1.

TABLE 1

| COMPOSITION | Tc1 (° C.) | Tcx (° C.) | Tc2 (° C.) | (Tcx or Tc2) − Tc1 (° C.) |
|---|---|---|---|---|
| A | 191 | 243 | 328 | 52 |
| B | 190 | 263 | 290 | 73 |
| C | 190 | — | 273 | 83 |

Figure 3:
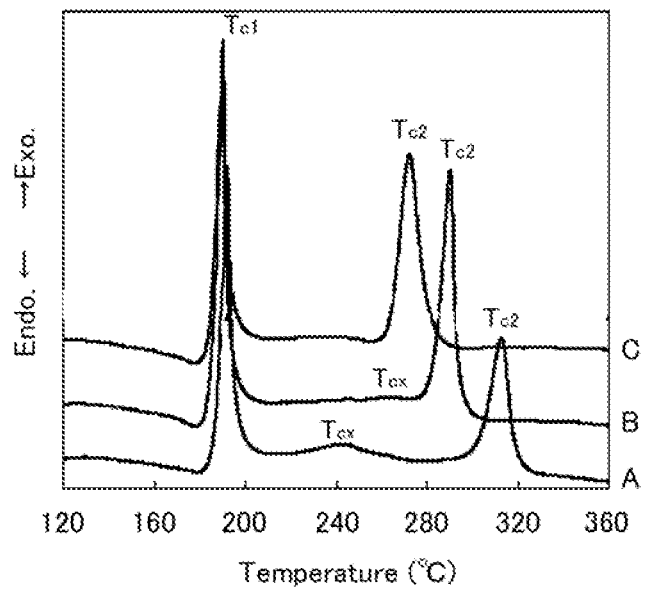
FIG. 3 shows a result of DTA analysis of the sulfide glasses respectively with compositions A to C.

As shown in FIG. 3 and Table 1, T$_{c1}$ of the sulfide glass with the compositions A to C was near 190° C. Meanwhile, when the composition A is compared to the composition B, it was able to confirm that with the T$_{cx}$ is shifted to a high temperature side in the composition B. Furthermore, it is believed that the exothermic peak of T$_{cx}$ and the exothermic peak of T$_{c2}$ are overlapped with each other in the composition C.

(Measurement of Li Ion Conductivity)

Measurement of Li ion conductivity was performed for the sulfide solid electrolyte materials which have been obtained from Comparative Examples 1-1 to 1-4 and Examples 1-1 to 1-4. First, the sample was cold-pressed under pressure of 4 ton/cm$^2$ to yield a pellet with φ of 11.29 mm and thickness of about 500 μm. Next, the pellet was added to a vessel filled with Ar gas to have an inert atmosphere followed by measurement. For the measurement, Solartron™ (SI1260, manufactured by TOYO Corporation) was used. Furthermore, the measurement temperature was adjusted to 25° C. by using a constant-temperature bath. The results are shown in FIG. 4 and Table 2.

Figure 4:
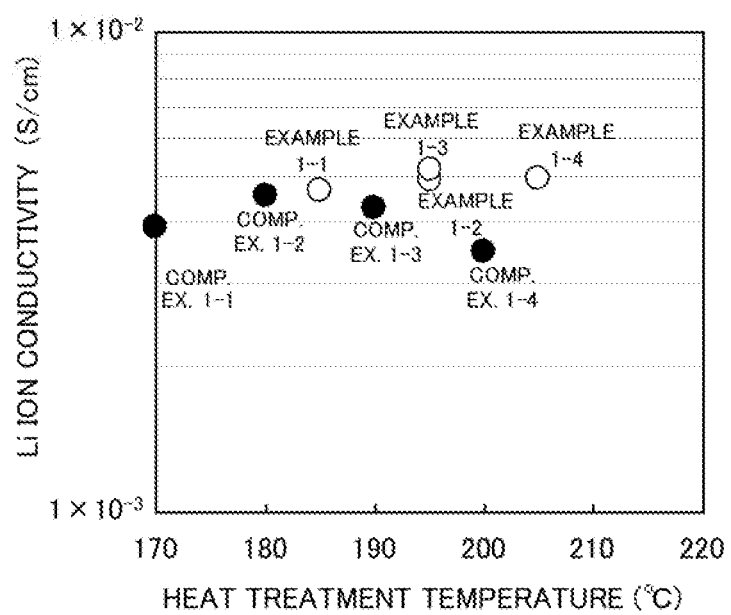
FIG. 4 shows a result of Li ion conductivity measurement of the sulfide solid electrolyte materials obtained from Comparative Examples 1-1 to 1-4 and Examples 1-1 to 1-4.

As shown in FIG. 4 and Table 2, in Comparative Examples 1-1 to 1-4, the Li ion conductivity decreased when the heat treatment temperature is higher than 180° C. On the other hand, in Examples 1-1 to 1-4, the Li ion conductivity increased even when the heat treatment temperature is higher than 180° C.

(X-Ray Diffraction Measurement).

X-ray diffraction measurement was performed for the sulfide solid electrolyte materials which have been obtained from Comparative Examples 1-1 to 1-4 and Examples 1-1 to 1-4. Namely, by using an XRD apparatus (RINT-UltimaIII™) manufactured by Rigaku Corporation, powder XRD measurement was performed. The sample was applied on a jig with dome shape, and the measurement was performed in the range of 2θ=10° to 60° under inert atmosphere of Ar gas. The scanning speed was 5°/min, and the sampling width was 0.02°. Furthermore, the half width value of the peak at 2θ=20.2° was obtained. The results are shown in FIG. 5, FIGS. 6A and 6B, and Table 2.

TABLE 2

| | COMPOSITION | HEAT TREATMENT TEMPERATURE (° C.) | Li ION CONDUCTIVITY (S/cm) | $I_{20.2}/I_{21.0}$ | HALF WIDTH (°) |
|---|---|---|---|---|---|
| COMPARATIVE EXAMPLE 1-1 | A | 170 | $3.9 \times 10^{-3}$ | — | 0.550 |
| COMPARATIVE EXAMPLE 1-2 | A | 180 | $4.6 \times 10^{-3}$ | 2.1 | 0.511 |
| COMPARATIVE EXAMPLE 1-3 | A | 190 | $4.3 \times 10^{-3}$ | 2.0 | 0.510 |
| COMPARATIVE EXAMPLE 1-4 | A | 200 | $3.49 \times 10^{-3}$ | 0.54 | 0.488 |
| EXAMPLE 1-1 | B | 185 | $4.7 \times 10^{-3}$ | — | 0.442 |
| EXAMPLE 1-2 | B | 195 | $4.9 \times 10^{-3}$ | — | 0.431 |
| EXAMPLE 1-3 | C | 195 | $5.2 \times 10^{-3}$ | — | 0.437 |
| EXAMPLE 1-4 | C | 205 | $4.9 \times 10^{-3}$ | — | 0.419 |

Figure 5:
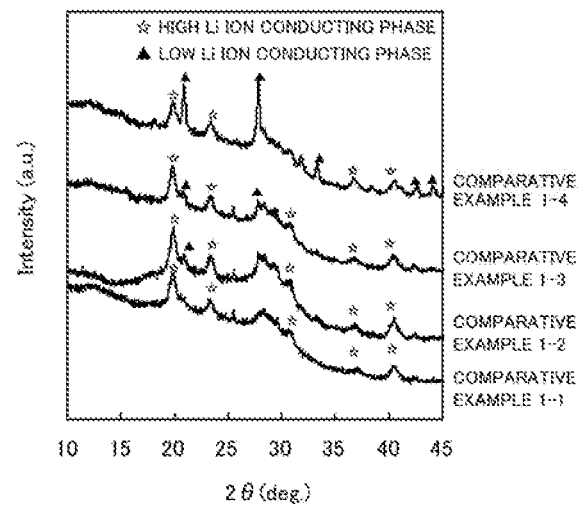
FIG. 5 shows a result of X-ray diffraction measurement of the sulfide solid electrolyte materials obtained from Comparative Examples 1-1 to 1-4.
Figure 6A:
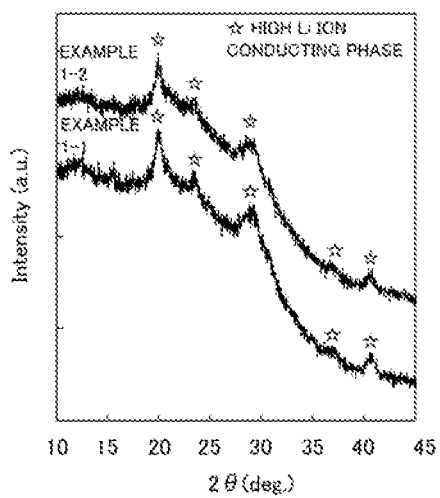
FIGS. 6A and 6B show each a result of X-ray diffraction measurement of the sulfide solid electrolyte materials obtained from Examples 1-1 to 1-4.
Figure 6B:
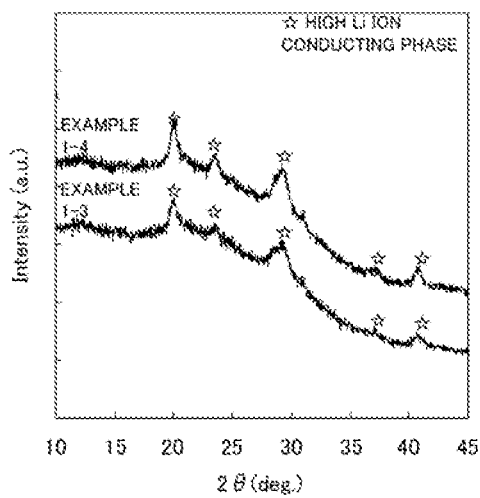

As shown in FIG. 5, FIGS. 6A and 6B, and Table 2, in Comparative Examples 1-1 to 1-4, the half width deceases and the peak of low Li ion conducting phase increased in accordance with an increase in the heat treatment temperature, and the Li ion conductivity decreases as the heat treatment temperature is higher than 180° C. On the other hand, in Examples 1-1 to 1-4, no peak of a low Li ion conducting phase was shown, the half width was small, and the Li ion conductivity increased. Incidentally, in Example 1 according to JP-A No. 2013-016423, no peak of a low Li ion conducting phase is shown. However, the L ion conductivity was as low as $2.9 \times 10^{-3}$ S/cm. Furthermore, as a result of measuring the half width, it was found to be 0.56°.

Comparative Examples 2-1 to 2-5 and Examples 2-1 to 2-3

A sulfide solid electrolyte material was obtained in the same manner Comparative Example 1-1 except that the ratio of $Li_2S$ (manufactured by Nippon Chemical Industrial Co., Ltd.), $P_2S_5$ (manufactured by Sigma-Aldrich Co. LLC), and LiI (manufactured by NIPPOH CHEMICALS CO., LTD.) and the heat treatment temperature were adjusted to the conditions that are described in Table 4.

[Evaluation 2]
(DTA Measurement)

DTA analysis was performed for the sulfide glasses which have been obtained during the synthesis of Comparative Examples 2-1 to 2-5 and Examples 2-1 to 2-3. The measurement conditions are the same as those described above. The results are shown in FIG. 7 and Table 3.

TABLE 3

| | LiI AMOUNT (mol %) | $Li_2S:P_2S_5$ | Tc1 (° C.) | Tcx (° C.) | Tc2 (° C.) | Tcx − Tc1 (° C.) |
|---|---|---|---|---|---|---|
| COMPARATIVE EXAMPLE 2-1 | 20 | 74:26 | 190 | 233 | 319 | 44 |
| COMPARATIVE EXAMPLE 2-2 | 20 | 74.3:25.7 | 195 | 227 | 286 | 32 |
| COMPARATIVE EXAMPLE 2-3 | 20 | 74.5:25.5 | 194 | 246 | 305 | 52 |
| COMPARATIVE EXAMPLE 2-4 | 20 | 75:25 | 191 | 243 | 328 | 52 |
| COMPARATIVE EXAMPLE 2-5 | 20 | 75.5:24.5 | 191 | 237 | 324 | 46 |
| EXAMPLE 2-1 | 20 | 76:24 | 191 | 246 | 329 | 55 |
| EXAMPLE 2-2 | 20 | 76.5:23.5 | 184 | 239 | 323 | 55 |
| EXAMPLE 2-3 | 20 | 78:22 | 190 | 246 | 326 | 56 |

Figure 7:
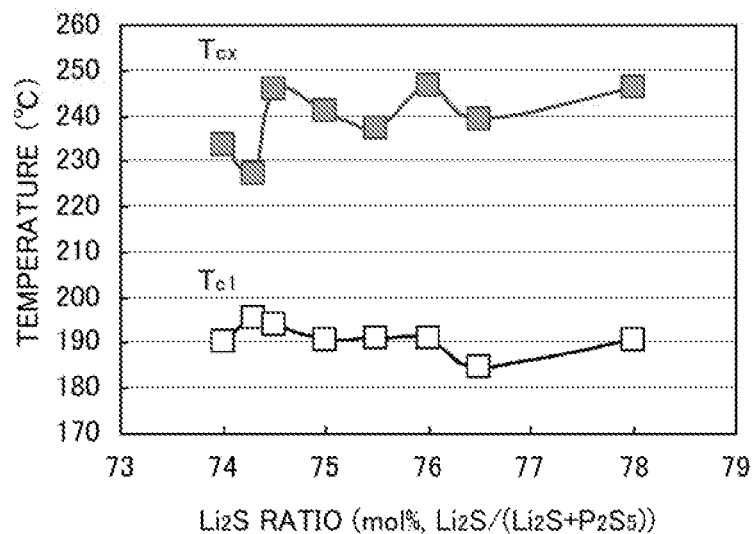
FIG. 7 is a graph showing the relationship between the $Li_2S$ ratio and crystallization temperature.

As shown in FIG. 7 and Table 3, the difference between $T_{cx}$ and $T_{c1}$ is increased in Examples 2-1 to 2-3.

(Measurement of Li Ion Conductivity and Measurement of X-Ray Diffraction)

Measurement of Li ion conductivity and measurement of X-ray diffraction were performed for the sulfide solid electrolyte materials which have been obtained during the synthesis of Comparative Examples 2-1 to 2-5 and Examples 2-1 to 2-3. The measurement conditions are the same as those described above. The results are shown in FIG. 8 and Table 4.

TABLE 4

| | LiI AMOUNT (mol %) | $Li_2S:P_2S_5$ | HEAT TREATMENT TEMPERATURE (° C.) | Li ION CONDUCTIVITY (S/cm) |
|---|---|---|---|---|
| COMPARATIVE EXAMPLE 2-1 | 20 | 74:26 | 180 | $2.04 \times 10^{-3}$ |
| COMPARATIVE EXAMPLE 2-2 | 20 | 74.3:25.7 | 170 | $1.75 \times 10^{-3}$ |
| COMPARATIVE EXAMPLE 2-3 | 20 | 74.5:25.5 | 170 | $1.92 \times 10^{-3}$ |
| COMPARATIVE EXAMPLE 2-4 | 20 | 75:25 | 180 | $4.6 \times 10^{-3}$ |
| COMPARATIVE EXAMPLE 2-5 | 20 | 75.5:24.5 | 185 | $9.85 \times 10^{-4}$ |
| EXAMPLE 2-1 | 20 | 76:24 | 185 | $4.66 \times 10^{-3}$ |
| EXAMPLE 2-2 | 20 | 76.5:23.5 | 180 | $3.90 \times 10^{-3}$ |
| EXAMPLE 2-3 | 20 | 78:22 | 180 | $1.92 \times 10^{-3}$ |

Figure 8:
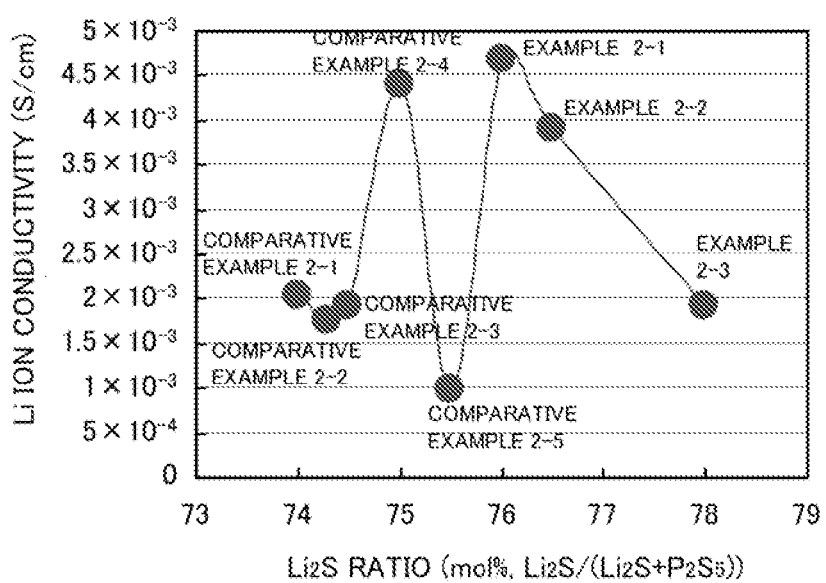
FIG. 8 is a graph showing the relationship between the $Li_2S$ ratio and Li ion conductivity.

As shown in FIG. 8 and Table 4, the Li ion conductivity was exceptionally high in Comparative Example 2-4, and it is believed that the high conductivity is caused by forming of $Li_3PS_4$ in an ideal manner. Furthermore, as the heat treatment of Examples 2-1 to 2-3 were not made at conditions in which $T_{cx}$ shifted to a high temperature side is taken into consideration, and thus the result of Li ion conductivity is a merely a reference value.

Comparative Example 3-1

A sulfide solid electrolyte material was obtained in the same manner as Comparative Example 1-2 which has been described above.

Comparative Example 3-2

A sulfide solid electrolyte material was obtained in the same manner as Comparative Example 3-1 except that the heat treatment time was changed to 5 hours.

Comparative Example 3-3

A sulfide solid electrolyte material was obtained in the same manner as Comparative Example 3-1 except that the heat treatment time was changed to 10 hours.

Comparative Example 3-4

A sulfide solid electrolyte material (a sulfide glass) was obtained in the same manner as Comparative Example 3-1 except that, 0.586 g of $Li_2S$, 0.945 g of $P_2S_5$, 0.284 g of LiI, and 0.185 g of LiBr were used such that $Li_2S$ (manufactured by Nippon Chemical Industrial Co., Ltd.), $P_2S_5$ (manufactured by Sigma-Aldrich Co. LLC), LiI (manufactured by NIPPOH CHEMICALS CO., LTD.) and LiBr (manufactured by Kojundo Chemical Laboratory Co., Ltd.) were used as starting materials, and no heat treatment was performed. Incidentally, the composition is 10LiI·10LiBr·80 (0.75$Li_2S$·0.25$P_2S_5$) in terms of molar expression, and this composition is designated as composition D.

Example 3-1

A sulfide solid electrolyte material was obtained in the same manner as Comparative Example 3-4 except that the heat treatment temperature was set at 175° C. and the heat treatment time was changed to 10 hours.

Example 3-2

A sulfide solid electrolyte material was obtained in the same manner as Example 3-1 except that the heat treatment time was changed to 70 hours.

Example 3-3

A sulfide solid electrolyte material was obtained in the same manner as Example 3-1 except that the heat treatment temperature was set at 185° C.

Reference Example 3-1

A sulfide solid electrolyte material was obtained in the same manner as Example 3-3 except that the heat treatment time was changed to 70 hours.

[Evaluation 3]
(DTA Measurement)

DTA analysis was performed for the sulfide glass of composition A or D. The measurement conditions are the same as those described above. The results are shown in FIG. 9 and Table 5.

TABLE 5

| COMPOSITION | Tc1 (° C.) | Tcx (° C.) | Tc2 (° C.) | (Tcx or Tc2) − Tc1 (° C.) |
|---|---|---|---|---|
| A | 191 | 243 | 328 | 52 |
| D | 190 | — | 273 | 83 |

Figure 9:
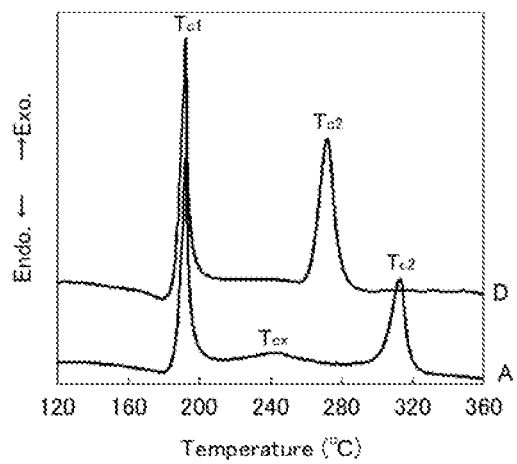
FIG. 9 shows a result of DTA analysis of the sulfide glasses respectively with compositions A and D.

As shown in FIG. 9 and Table 5, $T_{c1}$ of the sulfide glass with composition A or D was near 190° C. Meanwhile, when the composition A is compared with the composition D, it is believed that, as the $T_{cx}$ is shifted to a high temperature side in the composition D so that the exothermic peak of $T_{cx}$ is overlapped with the exothermic peak of $T_{c2}$.

(Measurement of Li Ion Conductivity and Measurement of X-Ray Diffraction)

Measurement of Li ion conductivity and measurement of X-ray diffraction were performed for the sulfide solid electrolyte materials which have been obtained from Comparative Examples 3-1 to 3-4, Examples 3-1 to 3-3 and Reference Example 3-1. The measurement conditions are the same as those described above. The results are shown in FIG. 10 to FIG. 12 and Table 6.

TABLE 6

| | COMPOSITION | HEAT TREATMENT CONDITION | Li ION CONDUCTIVITY (S/cm) |
|---|---|---|---|
| COMPARATIVE EXAMPLE 3-1 | A | 180° C. 3 h | 4.6 × 10⁻³ |
| COMPARATIVE EXAMPLE 3-2 | A | 180° C. 5 h | 4.55 × 10⁻³ |
| COMPARATIVE EXAMPLE 3-3 | A | 180° C. 10 h | 3.45 × 10⁻³ |
| COMPARATIVE EXAMPLE 3-4 | D | None | 1.4 × 10⁻³ |
| EXAMPLE 3-1 | D | 175° C. 10 h | 4.25 × 10⁻³ |
| EXAMPLE 3-2 | D | 175° C. 70 h | 5.03 × 10⁻³ |
| EXAMPLE 3-3 | D | 185° C. 10 h | 4.42 × 10⁻³ |
| REFERENCE EXAMPLE 3-1 | D | 185° C. 70 h | 5.15 × 10⁻³ |

Figure 10:
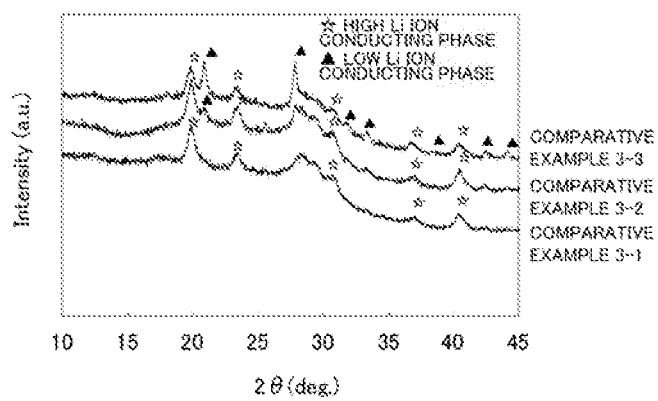
FIG. 10 shows a result of X-ray diffraction measurement of the sulfide solid electrolyte materials obtained from Comparative Examples 3-1 to 3-3.
Figure 11A:
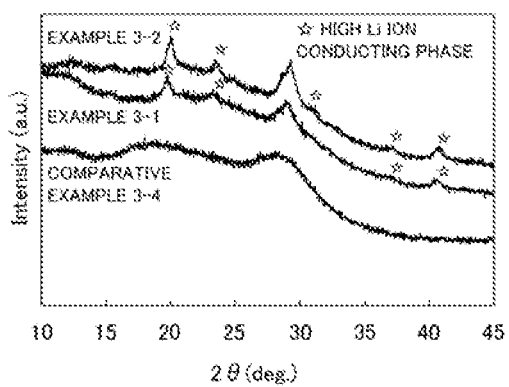
FIGS. 11A and 11B show each a result of X-ray diffraction measurement of the sulfide solid electrolyte materials obtained from Examples 3-1 to 3-3, Reference Example 3-1 and Comparative Example 3-4.
Figure 11B:
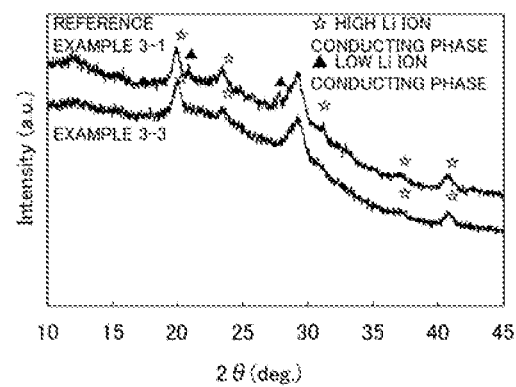
Figure 12:
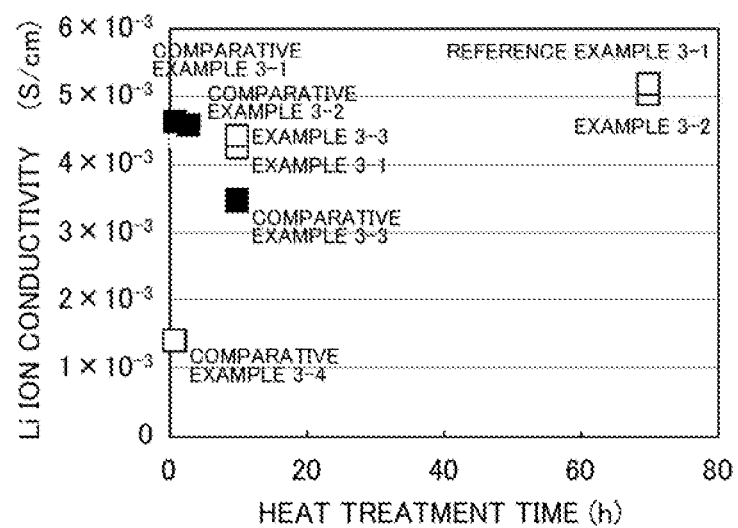
FIG. 12 is a graph showing the relationship between the heat treatment time and Li ion conductivity.

As shown in FIG. 10 to FIG. 12 and Table 6, in Comparative Examples 3-1 to 3-3, the peak of a low Li ion conducting phase increased in accordance with an increase in the heat treatment time. On the other hand, in Examples 3-1 to 3-3, a low Li ion conducting phase was not produced. In this regard, it is believed to be caused by shift of $T_{cx}$ of a sulfide glass to a high temperature side.

Comparative Examples 4-1 to 4-4

A sulfide solid electrolyte material was obtained in the same manner as Comparative Examples 1-1 to 1-4 which have been described above.

Reference Example 4-1

A sulfide solid electrolyte material was each obtained in the same manner as Comparative Example 4-2 except that, 0.585 g of $Li_2S$, 0.944 g of $P_2S_5$, 0.426 g of LiI, and 0.045 g of LiCl were used such that $Li_2S$ (manufactured by Nippon Chemical Industrial Co., Ltd.), $P_2S_5$ (manufactured by Sigma-Aldrich Co. LLC), LiI (manufactured by NIPPOH CHEMICALS CO., LTD.) and LiCl (manufactured by Kojundo Chemical Laboratory Co., Ltd.) were used as starting materials. Incidentally, the composition is $15LiI \cdot 5LiCl \cdot 80(0.75Li_2S \cdot 0.25P_2S_5)$ in terms of molar expression, and this composition is designated as composition E.

Example 4-1

A sulfide solid electrolyte material was obtained in the same manner as Reference Example 4-1 except that the heat treatment temperature was set at 190° C.

Example 4-2

A sulfide solid electrolyte material was obtained in the same manner as Reference Example 4-1 except that the heat treatment temperature was set at 200° C.

[Evaluation 4]
(DTA Measurement)

DTA analysis was performed for the sulfide glass of composition A or E. The measurement conditions are the same as those described above. The results are shown in Table 7.

TABLE 7

| COMPOSITION | Tc1 (° C.) | Tcx (° C.) | Tc2 (° C.) | (Tcx or Tc2) − Tc1 (° C.) |
|---|---|---|---|---|
| A | 191 | 243 | 328 | 52 |
| E | 191 | — | 264 | 73 |

As shown in Table 7, $T_{c1}$ of the sulfide glass with composition A or E was near 190° C. Meanwhile, when the composition A is compared with the composition E, it is believed that, as the $T_{cx}$ is shifted to a high temperature side in the composition E, the exothermic peak of $T_{cx}$ is overlapped with the exothermic peak of $T_{c2}$.

(Measurement of Li Ion Conductivity and Measurement of X-Ray Diffraction)

Measurement of Li ion conductivity and measurement of X-ray diffraction were performed for the sulfide solid electrolyte materials which have been obtained from Reference Example 4-1 and Examples 4-1 and 4-2. The measurement conditions are the same as those described above. The results are shown in FIG. 13, FIG. 14 and Table 8.

Figure 13:
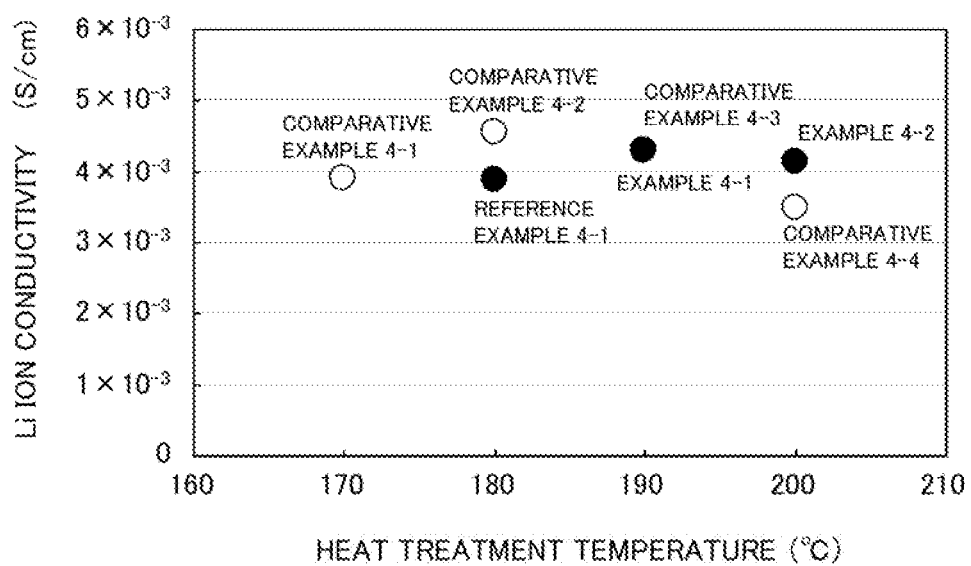
FIG. 13 is a graph showing the relationship between the heat treatment time and Li ion conductivity.
Figure 14:
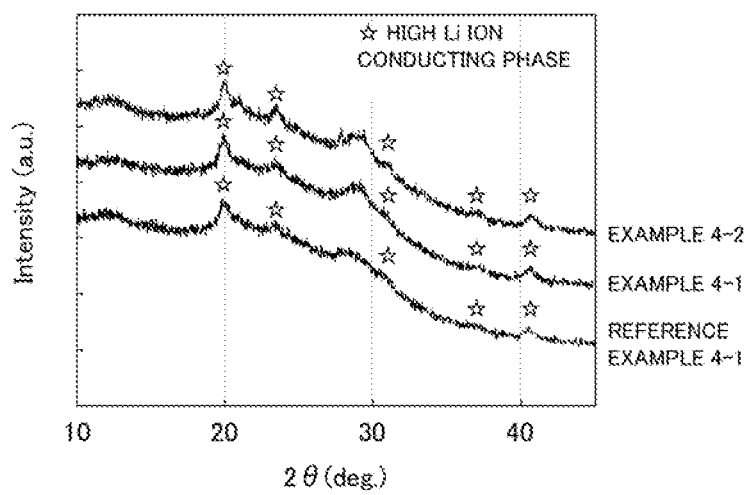
FIG. 14 shows a result of X-ray diffraction measurement of the sulfide solid electrolyte materials obtained from Examples 4-1 and 4-2 and Reference Example 4-1.

As shown in FIG. 13, FIG. 14, and Table 8, in Examples 4-1 and 4-2, the peak of a low Li ion conducting phase did not appear, the half width was small, and also the Li ion conductivity has increased.

REFERENCE SIGNS LIST

1 CATHODE ACTIVE MATERIAL LAYER
2 ANODE ACTIVE MATERIAL LAYER
3 SOLID ELECTROLYTE LAYER
4 CATHODE CURRENT COLLECTOR
5 ANODE CURRENT COLLECTOR
10 SOLID STATE LITHIUM BATTERY

The invention claimed is:

1. A sulfide solid electrolyte material comprising
an ion conductor having Li, P and S, and having a $PS_4^{3-}$ structure as a main component of an anion structure,
LiI, and
at least one of LiBr and LiCl,
wherein the sulfide solid electrolyte material contains a high Li ion conducting phase having peaks at $2\theta=20.2°$ and $23.6°$, does not contain low Li ion conducting phase having peaks at $2\theta=21.0°$ and $28.0°$ in an X-ray diffraction measurement using a CuKα ray, and has a half width of the peak at $2\theta=20.2°$ of $0.51°$ or less.

2. The sulfide solid electrolyte material according to claim 1, comprising the LiBr,
wherein LiBr/(LiI+LiBr) is in the range of 25 mol % to 50 mol %.

3. The sulfide solid electrolyte material according to claim 1, comprising the LiCl,
wherein LiCl/(LiI+LiCl) is in the range of 15 mol % to 50 mol %.

4. The sulfide solid electrolyte material according to claim 1, using a raw material composition which contains $Li_2S$, $P_2S_5$, LiI, and at least one of LiBr and LiCl,
wherein $Li_2S/(Li_2S+P_2S_5)$ is in the range of 76 mol % to 78 mol %.

5. A sulfide glass, the sulfide glass being used for the sulfide solid electrolyte material according to claim 1,
wherein an exothermic peak of the high Li ion conducting phase (c1) and an exothermic peak of the low Li ion conducting phase (cx) are observed by differential thermal analysis, and the sulfide glass satisfies $T_{cx} - T_{c1} \geq 55°$ C. when temperature of the exothermic peak of the c1 is $T_{c1}$ and temperature of the exothermic peak of the cx is $T_{cx}$ in differential thermal analysis, and

TABLE 8

| | COMPOSITION | HEAT TREATMENT TEMPERATURE (° C.) | Li ION CONDUCTIVITY (S/cm) | $I_{20.2}/I_{21.0}$ | HALF WIDTH (°) |
|---|---|---|---|---|---|
| COMPARATIVE EXAMPLE 4-1 | A | 170 | $3.9 \times 10^{-3}$ | — | 0.550 |
| COMPARATIVE EXAMPLE 4-2 | A | 180 | $4.6 \times 10^{-3}$ | 2.1 | 0.511 |
| COMPARATIVE EXAMPLE 4-3 | A | 190 | $4.3 \times 10^{-3}$ | 2.0 | 0.510 |
| COMPARATIVE EXAMPLE 4-4 | A | 200 | $3.49 \times 10^{-3}$ | 0.54 | 0.488 |
| REFERENCE EXAMPLE 4-1 | E | 180 | $3.9 \times 10^{-3}$ | — | 0.540 |
| EXAMPLE 4-1 | E | 190 | $4.3 \times 10^{-3}$ | — | 0.495 |
| EXAMPLE 4-2 | E | 200 | $4.1 \times 10^{-3}$ | — | 0.502 | the sulfide solid electrolyte material may be obtained by a heat treatment.

6. A sulfide glass, the sulfide glass being used for the sulfide solid electrolyte material according to claim 1, comprising: the ion conductor; the LiI; and the LiBr,
wherein LiBr/(LiI+LiBr) is in the range of 25 mol % to 50 mol %,
an exothermic peak of the high Li ion conducting phase (c1) and an exothermic peak of the low Li ion conducting phase (cx) are observed by differential thermal analysis, and the sulfide glass satisfies $T_{cx}-T_{c1} \geq 55°$ C. when temperature of the exothermic peak of the c1 is $T_{c1}$ and temperature of the exothermic peak of the cx is $T_{cx}$ in differential thermal analysis, and
the sulfide solid electrolyte material may be obtained by a heat treatment.

7. A solid state lithium battery comprising: a cathode active material layer containing a cathode active material; an anode active material layer containing an anode active material; and a solid electrolyte layer formed between the cathode active material layer and the anode active material layer,
wherein at least one of the cathode active material layer, the anode active material layer, and the solid electrolyte layer contains the sulfide solid electrolyte material according to claim 1.

8. A method for producing a sulfide solid electrolyte material according to claim 1, the method comprising steps of:
an amorphizing step of obtaining a sulfide glass by amorphization of a raw material composition that contains $Li_2S$, $P_2S_5$, LiI, and at least one of LiBr and LiCl; and
a heat treatment step of heating the sulfide glass,
wherein the method uses the sulfide glass in which an exothermic peak of the high Li ion conducting phase (c1) and an exothermic peak of the low Li ion conducting phase (cx) are observed by differential thermal analysis;
the sulfide glass satisfies $T_{cx}-T_{c1} \geq 55°$ C. when temperature of the exothermic peak of the c1 is $T_{c1}$ and temperature of the exothermic peak of the cx is $T_{cx}$ in differential thermal analysis; and
the heat treatment is performed from $(T_{cx}-50)°$ C. to $(T_{c1}-10)°$ C. when the treatment time is less than 10 hours, and heat treatment is performed from $(T_{c1}+5)°$ C. to $(T_{c1}-20)°$ C. when the treatment time is 10 hours or more.

9. The sulfide solid electrolyte material according to claim 1, wherein a peak of $Li_2S$ is not observed in an X-ray diffraction measurement.

10. The sulfide solid electrolyte material according to claim 1 produced from a method comprising:
an amorphizing step of obtaining a sulfide glass by amorphization of a raw material composition that contains $Li_2S$, $P_2S_5$, LiI, and at least one of LiBr and LiCl; and
a heat treatment step of heating the sulfide glass,
wherein the method uses the sulfide glass in which an exothermic peak of the high Li ion conducting phase (c1) and an exothermic peak of the low Li ion conducting phase (cx) are observed by differential thermal analysis;
the sulfide glass satisfies $T_{cx}-T_{c1} \geq 55°$ C. when temperature of the exothermic peak of the c1 is $T_{c1}$ and temperature of the exothermic peak of the cx is $T_{cx}$ in differential thermal analysis; and
the heat treatment is performed from $(T_{cx}-50)°$ C. to $(T_{c1}-10)°$ C. when the treatment time is less than 10 hours, and heat treatment is performed from $(T_{c1}+5)°$ C. to $(T_{c1}-20)°$ C. when the treatment time is 10 hours or more.

11. The sulfide solid electrolyte material according to claim 1, wherein the high Li ion conducting phase further comprises at least one peak at $2\theta=29.4°$, $37.8°$, $41.1°$, and $47.0°$.

12. The sulfide solid electrolyte material according to claim 1, wherein the high Li ion conducting phase further comprises peaks at $2\theta=29.4°$, $37.8°$, $41.1°$, and $47.0°$.

13. The sulfide solid electrolyte material according to claim 1, wherein the sulfide solid electrolyte material does not substantially contain $Li_2S$.

14. The sulfide solid electrolyte material according to claim 1, wherein the sulfide solid electrolyte material does not substantially contain cross-linking sulfur.

15. The sulfide solid electrolyte material according to claim 2, wherein the sulfide solid electrolyte material has a composition of $aLiX \cdot (1-a)(bLi_2S \cdot (1-b)P_2S_5)$, wherein "LiX" represents LiI and LiBr, "a" satisfies $0.1 \leq a \leq 0.3$, and "b" satisfies $0.74 \leq b \leq 0.76$.

16. The sulfide solid electrolyte material according to claim 15, wherein "a" satisfies $0.15 \leq a \leq 0.25$.

17. The sulfide solid electrolyte material according to claim 3, wherein LiCl/(LiI+LiCl) is in the range of 25 mol % to 50 mol %, and
the sulfide solid electrolyte material has a composition of $aLiX \cdot (1-a)(bLi_2S \cdot (1-b)P_2S_5)$, wherein "LiX" represents LiI and LiCl, "a" satisfies $0.1 \leq a \leq 0.3$, and "b" satisfies $0.74 \leq b \leq 0.76$.

* * * * *